US009423232B2

(12) United States Patent
Dall'Aglio et al.

(10) Patent No.: US 9,423,232 B2
(45) Date of Patent: Aug. 23, 2016

(54) TOUCH PROBE WITH PIEZOELECTRIC SENSOR AND THERMAL INSULATION

(75) Inventors: Carlo Dall'Aglio, Castello d'Argile (IT); Antonio Gambini, San Miniato Basso (PI) (IT)

(73) Assignee: Marposs Societa' per Azioni, Bentivoglio (BO) (IT)

( * ) Notice: Subject to any disclaimer, the term of this patent is extended or adjusted under 35 U.S.C. 154(b) by 215 days.

(21) Appl. No.: 13/880,301

(22) PCT Filed: Oct. 25, 2011

(86) PCT No.: PCT/EP2011/068658
§ 371 (c)(1),
(2), (4) Date: Apr. 18, 2013

(87) PCT Pub. No.: WO2012/055866
PCT Pub. Date: May 3, 2012

(65) Prior Publication Data
US 2013/0205608 A1    Aug. 15, 2013

(30) Foreign Application Priority Data
Oct. 29, 2010  (IT) .............................. BO2010A0653

(51) Int. Cl.
| G01B 7/16 | (2006.01) |
| G01B 7/012 | (2006.01) |
| G01B 5/016 | (2006.01) |
| G01L 1/16 | (2006.01) |

(52) U.S. Cl.
CPC ............... *G01B 7/012* (2013.01); *G01B 5/016* (2013.01); *G01B 7/16* (2013.01); *G01L 1/16* (2013.01)

(58) Field of Classification Search
CPC ...... B01B 7/016; G01B 7/012; G01B 7/002; G01B 5/012; G01B 11/007; G01B 7/28
USPC ........ 33/561; 73/862.044–862.045, 862.338, 73/862.474, 862.627, 1.15
See application file for complete search history.

(56) References Cited

U.S. PATENT DOCUMENTS

| 3,646,818 A |   | 3/1972 | Little et al. |
| 3,945,124 A |   | 3/1976 | Jacoby et al. |
| 4,153,998 A |   | 5/1979 | McMurtry |
| 4,177,568 A |   | 12/1979 | Werner et al. |
| 4,462,162 A | * | 7/1984 | McMurtry ............... B23Q 1/36 33/1 M |

(Continued)

FOREIGN PATENT DOCUMENTS

| CN | 1688862 A | 10/2005 |
| CN | 1688863 A | 10/2005 |

(Continued)

*Primary Examiner* — Yaritza Guadalupe-McCall
(74) *Attorney, Agent, or Firm* — Blank Rome LLP

(57) ABSTRACT

A touch probe (1;1';1";1''') for applications in machine tools or measuring machines includes a support frame (2) with a protective casing (3), and a movable armset (5) with a feeler (11) to touch a part to be checked (13). The probe includes a laminar piezoelectric transducer (25) made of polymeric material, such as polyvinylidene fluoride, which is connected to the support frame and fixed at a bearing and locating area (7) on which the movable armset rests in a position defined by an isostatic rest system (17). A thermal insulation system is placed between the protective casing and the piezoelectric transducer and preferably includes at least one element (28) made of thermal insulating material, such as fiberglass, between the piezoelectric transducer and the support frame.

15 Claims, 8 Drawing Sheets

(56) References Cited

U.S. PATENT DOCUMENTS

| | | | | |
|---|---|---|---|---|
| 4,769,919 A | * | 9/1988 | Lloyd et al. | 33/558 |
| 4,833,792 A | * | 5/1989 | Aehnelt et al. | 33/558 |
| 4,972,594 A | * | 11/1990 | Gurny et al. | 33/561 |
| 4,984,449 A | * | 1/1991 | Caldwell | G01M 3/3245 73/290 V |
| 5,014,444 A | * | 5/1991 | Breyer | G01B 5/0014 33/502 |
| 5,209,131 A | * | 5/1993 | Baxter | 73/865.8 |
| 5,228,352 A | * | 7/1993 | McMurtry | G01B 11/007 33/558 |
| 5,299,360 A | | 4/1994 | Possati et al. | |
| 5,345,689 A | * | 9/1994 | McMurtry | G01B 3/008 33/556 |
| 5,834,650 A | | 11/1998 | Kim | |
| 6,484,589 B1 | * | 11/2002 | Brock | F04B 43/06 73/168 |
| 7,159,327 B2 | | 1/2007 | Baruchello et al. | |
| 7,168,179 B2 | | 1/2007 | Baruchello et al. | |
| 7,216,554 B2 | | 5/2007 | Morikawa | |
| 7,676,945 B2 | * | 3/2010 | Prestidge et al. | 33/559 |
| 2002/0104227 A1 | * | 8/2002 | Trull | G01B 5/012 33/558 |
| 2007/0062057 A1 | * | 3/2007 | Schopf | 33/561 |
| 2007/0113649 A1 | * | 5/2007 | Bharti et al. | 73/431 |
| 2008/0163507 A1 | * | 7/2008 | Hellier | G01B 7/012 33/503 |
| 2009/0043534 A1 | * | 2/2009 | Prestidge | G01B 7/012 702/152 |
| 2011/0178764 A1 | * | 7/2011 | York | G01B 5/008 702/152 |
| 2015/0362305 A1 | * | 12/2015 | Ferrari | G01N 29/225 33/503 |

FOREIGN PATENT DOCUMENTS

| | | |
|---|---|---|
| GB | 2 049 198 A | 12/1980 |
| JP | 63-18271 A | 1/1988 |
| JP | 6-313745 A | 11/1994 |
| JP | 2005-189116 | 7/2005 |

\* cited by examiner

TOUCH PROBE WITH PIEZOELECTRIC SENSOR AND THERMAL INSULATION

TECHNICAL FIELD

The present invention relates to a touch probe for checking position or dimensions of a part in machine tools or measuring machines including a support frame with a protective casing and a bearing and locating area, a movable armset that is partly housed in the protective casing and includes an arm carrying a feeler adapted to touch the part to be checked, a thrust device arranged between the support frame and the movable armset for urging the movable armset against the bearing and locating area, a constraint and positioning system between the movable armset and the support frame at the bearing and locating area, and a detection device with a laminar piezoelectric transducer connected to the support frame and adapted to provide a signal in consequence of a force applied to the feeler.

BACKGROUND ART

Touch probes with movable armsets carrying feelers are used in coordinate measuring machines and in machine tools, in particular in machining centres and lathes, for checking pieces that have been or have to be machined, tools, machine tables, etc. In each one of such probes, the contact between the feeler and, for example, a mechanical piece is signalled by suitable devices that detect certain movements of the movable armset with respect to a casing and control the readout of transducers associated to the slides of the machine, the transducers providing measuring values with respect to a reference position or origin.

A detection and signalling device of a probe, like the probe described in the patent No. U.S. Pat. No. 5,299,360, can include an electric circuit and at least one associated switch that is mechanically actuated in consequence of displacements occurred between the movable arm and the casing and causes the closure or, more frequently, the opening of the circuit.

Other probes with detection devices including electric circuits placed at support and positioning systems are known for example from the patent No. U.S. Pat. No. 4,153,998. Other types of touch probes can include detection devices of very different kind and arrangement, among them strain or piezoelectric transducers. Patents publications No. U.S. Pat. Nos. 3,945,124, 4,177,568, GB-A-2049198, U.S. Pat. Nos. 4,462,162 and 4,972,594 show probes of this type.

Among them, the patent No. U.S. Pat. No. 4,972,594 shows a probe with an armset that includes arms and feelers and is connected to a fixed frame in a movable way. In particular, the armset is coupled to an intermediate support at mechanical reference abutments. The probe includes two detection devices: a laminar shaped piezoelectric transducer that generates a signal right after one of the feelers has touched the mechanical part to be checked, and an electric circuit closed by contacts in the above mentioned mechanical reference abutments. To avoid false signalling by the piezoelectric transducer, which is particularly sensitive to vibrations or other noises and to thermal variations, the signal of such piezoelectric transducer is considered as indicative of the contact actually occurred between the feeler and the mechanical part only if such contact is confirmed within a certain delay by the opening of the electric circuit caused by the armset movement and the consequent separation between the mechanical abutments. This procedure for ensuring immunity to noises of different types may cause problems due to the delay necessarily introduced in the contact detection. Such problems even increase when it is not possible to completely control the closing rate—set by the machine cycles—between the probe ad the part to be checked.

The piezoelectric transducer is—as already mentioned—thermosensitive, i.e. sensitive to thermal variations, and when changes in temperature occur it can produce electric signals that may cause false contact signalling.

DISCLOSURE OF THE INVENTION

The object of the present invention is to implement a touch probe that is particularly reliable and substantially immune to errors due to environmental noises such as thermal variations.

This and other objects and advantages are achieved by a touch probe according to the present invention as defined in claim 1.

A touch probe according to the present invention includes a support frame with a protective casing and a bearing and locating area for a movable armset with an arm and a feeler.

The movable armset is urged against the support frame in a defined position at the bearing and locating area by a constraint and positioning system with an isostatic rest system including, for example, V-shaped seats in three support areas, and associated radial elements in the movable armset. A detection device includes a laminar piezoelectric transducer, preferably made of polyvinylidene fluoride, which is connected to the support frame at the bearing and locating area. A thermal insulation system is located between the protective casing and the transducer at the bearing and locating area, to make the piezoelectric transducer substantially insensitive to sudden changes in temperature. The thermal insulation system preferably include elements made of thermal insulating material, such as fibreglass, between the piezoelectric transducer and the support frame. The protective casing is preferably made of an iron-nickel alloy featuring low coefficient of thermal expansion, such as Invar®. The thermal insulation system can further include a hollow body housing the protective casing and defining a suitable thermal insulating hollow space. Preferably, the transducer includes three separated sensitive sectors placed at the three support areas. According to a preferred embodiment of the invention, the probe includes a second detection device, for example an electric circuit positioned at the isostatic rest system between the movable armset and the support frame. The signalling of such second detection device can be used in addition to that one of the piezoelectric transducer in order to confirm the latter, for example.

BRIEF DESCRIPTION OF THE DRAWINGS

The invention is now described with reference to the enclosed sheets of drawings given by way of non limiting example, wherein.

BEST MODE FOR CARRYING OUT THE INVENTION

Figure 1:
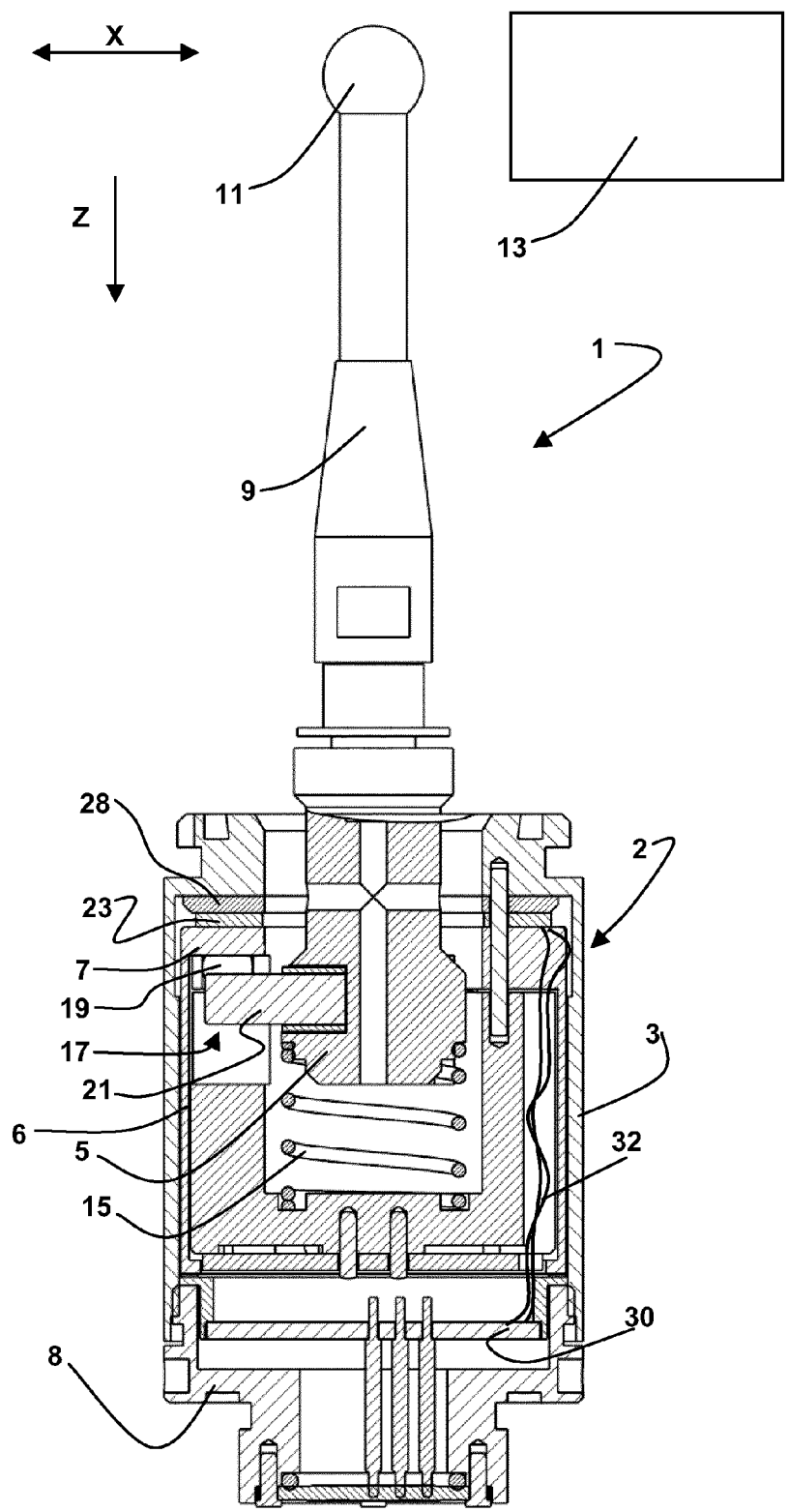
FIG. 1 is a simplified longitudinal section of a touch probe according to the invention.

The section of FIG. 1 shows, in a very simplified way, a touch probe 1, including a support frame 2 with a protective casing 3—substantially cylindrical shaped and composed by, for example, different portions assembled to each other—which defines a longitudinal geometric axis, and a movable armset 5, partly housed in the protective casing 3 and properly supported. The support frame 2 includes a substantially cylindrical, internal component 6, which is fixed to the protective casing 3 by means of a closing plate 8. More specifically, the closing plate 8 is screwed to the protective casing 3 and axially urges and keeps the internal component in place 6. The internal component 6 has a bearing and locating area 7 for the movable armset 5 and the latter includes an arm 9 carrying a feeler 11 adapted to touch a part to be checked, which is shown in simplified way in FIG. 1 and marked with the reference number 13. A thrust device with a compression spring 15 is arranged between the support frame 2 and the movable armset 5 and urges the latter against the bearing and locating area 7. A constraint and positioning system 17 between the movable armset 5 and the support frame 2 is placed at the bearing and locating area 7 and includes an isostatic rest system with three support areas, each with a couple of balls—just one ball being visible in the figure and marked with the reference number 19—fixed to the support frame 2, more specifically to the internal component 6, and defining a V-shaped seat—marked in the figure with the same reference number 19—and a radial element 21, for example cylindrical shaped, defined in the movable armset 5. In the inoperative condition of the probe shown in FIG. 1, that is when there is no contact between the feeler 11 and the part to be checked 13, the three radial elements 21 are arranged, thanks to the action of the spring 15, in the V-shaped seats defined by the balls 19, and thus define the position of the movable armset 5 with respect to the support frame 2 in a unique way.

According to alternative solutions, the V-shaped seats and the radial elements can be positioned in the movable armset 5 and the support frame 2, respectively, or the constraint and positioning system can be made in a different way, for example with a different isostatic rest system such as the one known as Kelvin coupling.

Figure 2A:
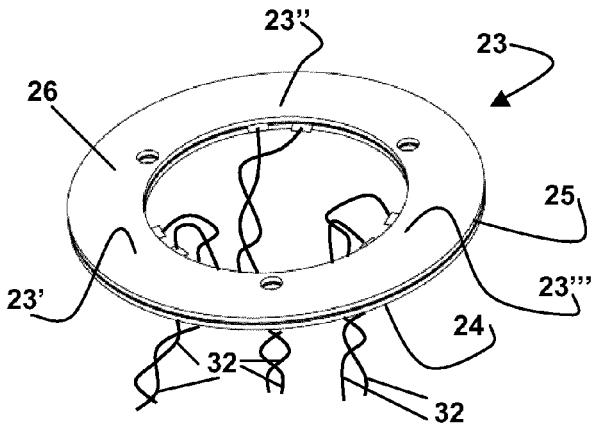
FIG. 2A is a perspective view of a component of the touch probe of FIG. 1, shown in an enlarged scale with respect to FIG. 1, FIGS. 2B and 2C are perspective, exploded views of the component of FIG. 2A from two different angles.
Figure 2B:
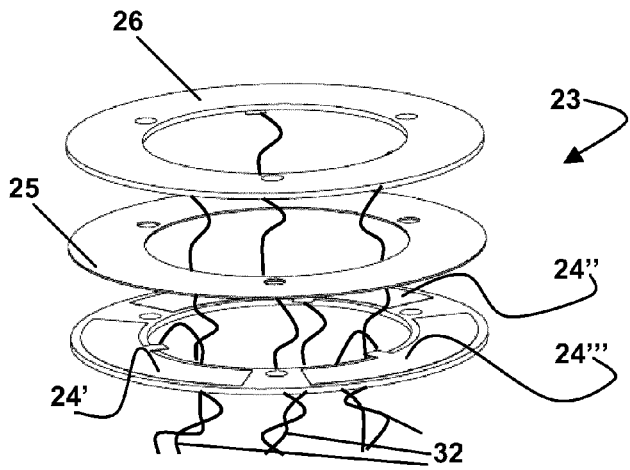
Figure 2C:
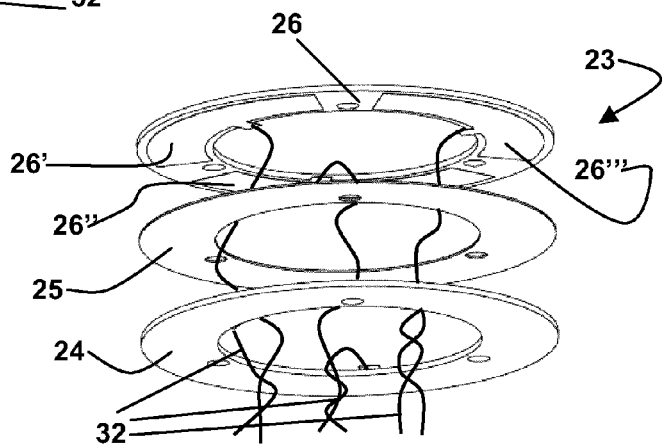

A detection device 23 includes at least one laminar piezoelectric element or transducer 25 that is arranged substantially on a plane perpendicular to the longitudinal geometric axis of the protective casing 3, and connected to the support frame 2 at the bearing and locating area 7. In particular, according to the preferred embodiment shown in FIGS. 2A, 2B and 2C, the detection device 23 includes two annular circuit boards 24 and 26, made of electrically insulating material such as fibreglass, between which the laminar piezoelectric transducer is tightly held and positioned. One side of each of the circuit boards 24 and 26, more specifically the side contacting the laminar piezoelectric transducer 25, has a conductive surface (for example made of copper or gold, according to known techniques) divided into three, substantially distinct, angular sectors 24', 24", 24''' and 26', 26", 26''', respectively. In this way, there are three sensitive sectors 23', 23", 23''' of the detection device 23 that is fixed to an area of the support frame 2 in such a way that each of the sensitive sectors 23', 23", 23''' is substantially centered with respect to one of the three support areas, i.e. with respect to one of the couples of balls 19 in the example of FIG. 1.

The present invention can include sensitive sectors 23', 23", 23''' that are different in number and/or have a different construction of the circuit boards 24, 26 and/or of the laminar piezoelectric transducer 25. For example the latter can be differently shaped or obtained from particular machining processes, per se known.

The detection device 23 is pressure locked between the internal component 6 and another area of the support frame 2 and at least one element 28 made of thermal insulating material is placed therebetween. In particular, the internal component 6, urged by the closing plate 8, urges in turn the detection device 23 on the side with the circuit board 24 against the element 28 made of thermal insulating material, and thus locks the detection device 23 to the support frame 2. The element 28, made for example of fibreglass, implements a thermal insulation system between the protective casing 3 and the laminar piezoelectric transducer 25 at the bearing and locating area 7. The element 28 can be annular shaped or divided into distinct parts that are arranged at different areas of the circuit board 26.

Figure 3:
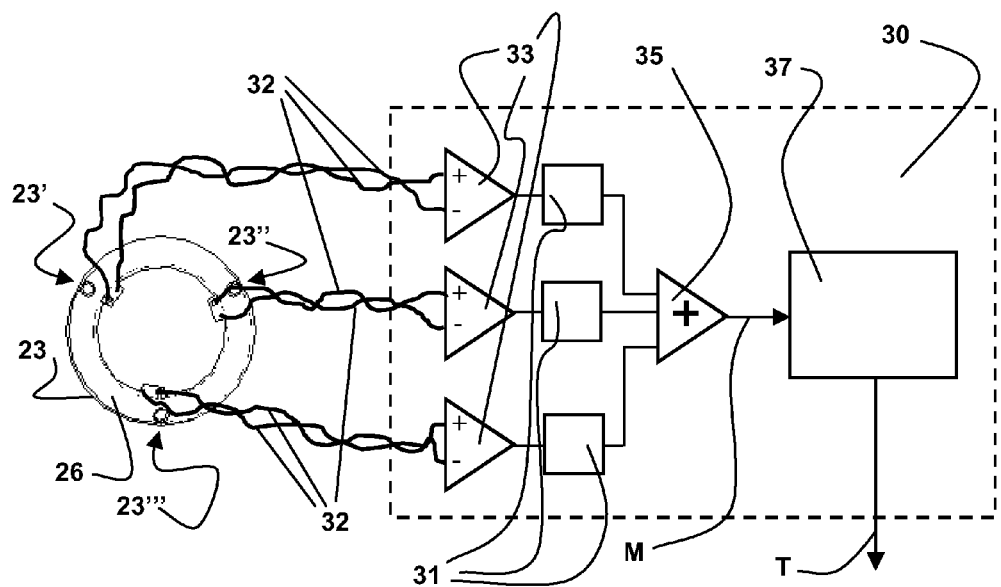
FIG. 3 is a circuit schematic diagram of processing means with components of the touch probe of FIG. 1.

According to alternative methods for connecting the detection device 23 to the support frame, the circuit board 24 is glued to the internal component 6 at the bearing and locating area 7, and/or the circuit board 26 is glued to the element 28 made of thermal insulating material. Processing means in signal conditioning electronics 30 include a microprocessor 37 (FIG. 3) and are arranged in the protective casing 3 and connected to the circuit boards 24 and 26 of the detection device 23 by means of electric leads that are schematically shown in FIG. 3 with couples of wires 32, each connected to a terminal in the circuit board 24 and to a terminal in the circuit board 26, both terminals being arranged at one of the three sensitive sectors 23',23",23'''.

The laminar piezoelectric transducer 25 is obtained by a sheet made of piezoelectric plastic material, preferably made of polymeric material such as polyvinylidene fluoride or PVDF. The characteristics of this material are such that it features a very high sensitivity in generating electric charges in consequence of compression or decompression phenomena to which the material itself is subject. Moreover, PVDF is a material featuring a substantially unlimited compressibility, thus mechanical restraints are not necessary. The circuit boards 24 and 26 detect and transmit such electric charges to the signal conditioning electronics 30 wherein, as schematically shown in FIG. 3, the signals in output from respective differential charge amplifiers 33 are converted into a digital number (as schematically shown in FIG. 3 by means of the functional blocks 31) and the relative absolute values are add up in an adder implemented by a software module 35 for obtaining a single force signal M, whose value is indicative of the overall force variation applied to the laminar piezoelectric transducer 25. The microprocessor 37 receives as input the force signal M and, depending on it, emits a touch signal T indicative of the touch occurred, which is transmitted in a known way, by means of electric wires or contactless systems, to an external interface unit not shown in the figures.

In the embodiment according to FIG. 1, the material used for the protective casing 3 is an iron-nickel alloy featuring extremely low coefficient of thermal expansion, typically about 1 ppm/C.° such as Invar® (registered trademark in USA and other countries).

The probe 1 operates as follows.

Further to mutual movements between the probe 1 and the part to be checked 13, for example along a transversal direction marked with the double arrow X in FIG. 1, the feeler 11 contacts the part 13, and a force is applied on the movable armset 5 and transmitted to the constraint and positioning system 17. At one or two out of the three support areas, the radial element 21 applies a thrust to the respective couple of balls 19 and, at the same time, the thrust applied by the spring 15 is released at the other support area(-s). The thrust action and the release action are transmitted to the detection device 23, more specifically to the laminar piezoelectric transducer 25 that undergoes a compression or a decompression at the sensitive sectors 23',23",23''', and thus generates electric charges that are detected by means of the terminals placed in the circuit boards 24 and 26, as hereinbefore briefly disclosed. The consequent force signal M, indicative of the force variation applied to the laminar piezoelectric transducer 25, is processed in the microprocessor 37, and in particular it is detected when a determined threshold value is exceeded and, immediately or after a certain delay, the touch signal T is emitted.

Similar effects on the laminar piezoelectric transducer 25 are caused by mutual contacts between the feeler 11 and the part to be checked 13 along directions differing from X, for example a contact occurring along the direction Z, in consequence of which, at least in theory, the thrust is released at the three support areas and the laminar piezoelectric transducer 25 thus undergoes a decompression at the sensitive sectors 23',23",23'''.

Figure 4:
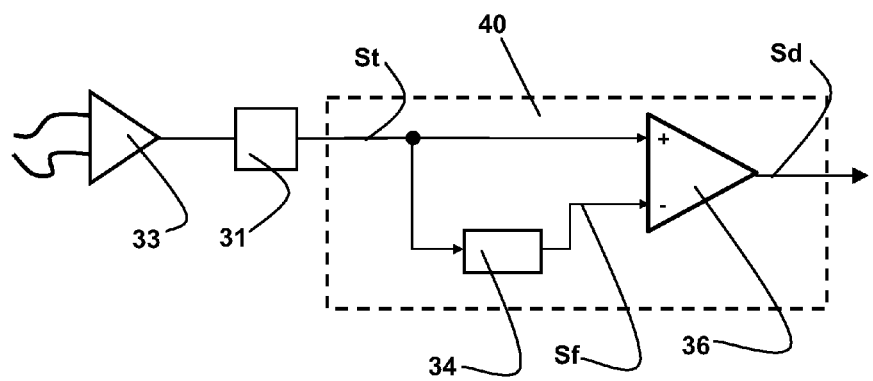
FIG. 4 is a circuit schematic diagram of a processing system of a signal in a probe according to the invention.

FIG. 4 schematically shows a possible expedient in the signal conditioning electronics 30 to prevent thermal variations undergone by the probe 1 from negatively affecting the performance of the probe 1 and thus providing false signalling. Indeed, the material of which the laminar piezoelectric transducer 25 is made can suffer such thermal variations and cause the generation of consequent, unwanted electric charges. In the solution with a processing system 40 according to the simple diagram of FIG. 4, the signal St provided by the laminar piezoelectric transducer, more specifically generated at each one of the sensitive sectors 23',23" and 23''' and digitized is sent to the entry of a filtering component, more specifically a low-pass filter 34, implemented in this case as a software module, featuring for example a cut-off frequency of about 1 Hz, and also to a numeric subtracting unit 36, implemented as a software module as well. The unit 36 outputs a signal Sd representing the difference, in absolute value, between such signal St and a filtered signal Sf in output from the low-pass filter 34. In this way, when the signal St undergoes gradual variations, like the ones typically caused by changes in temperature, the signal Sf undergoes the same variations and there is no signalling because the signal Sd in output from the unit 36 is substantially equal to zero. Whereas, when the variation of the signal St is sudden, as it happens in consequence of the contact between the feeler 11 and the part to be checked 13, a corresponding variation does not immediately occur in the signal Sf that remains unchanged and, as a consequence, the signal Sd in output from the unit 36 undergoes a sudden variation. Therefore, only in this case a force signal M different from zero will reach the microprocessor 37, enabling a correct signalling and the consequent generation of the touch signal T.

It should be noted that the thermal insulation system with the element 28 made of thermal insulating material, for example fibreglass, prevent sudden environmental, thermal variations, such as those caused by coolant spurts affecting the protective casing 3, from being transmitted to the laminar piezoelectric transducer 25 in a sudden way. This ensures that the protective action of the expedient of FIG. 4 is proper and reliable.

Moreover, the use of material featuring low coefficient of thermal expansion, such as Invar®, for the protective casing 3 prevents environmental thermal variations from causing changes in the dimensions of the protective casing 3. Indeed such changes in dimensions could apply voltage to the laminar piezoelectric transducer 25 and cause further false signalling.

As an alternative to the expedient of FIG. 4 (in which the circuit diagram shows functional elements that are preferably implemented via software) there are other possible protection systems against environmental noises, more specifically noises caused by thermal variations.

Figure 5:
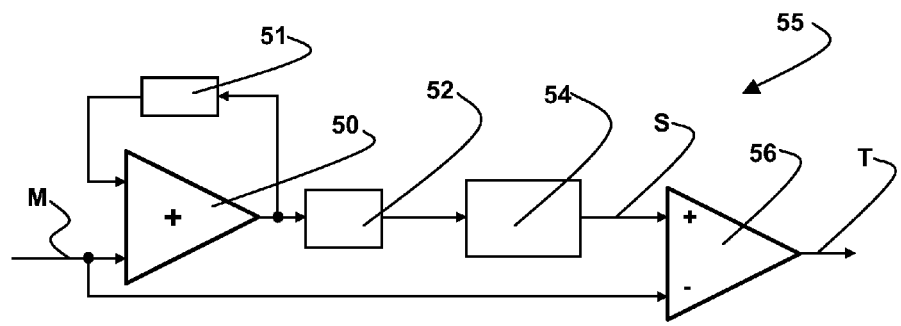
FIG. 5 is a circuit schematic diagram of a different processing system in a probe according to the invention.
Figure 6:
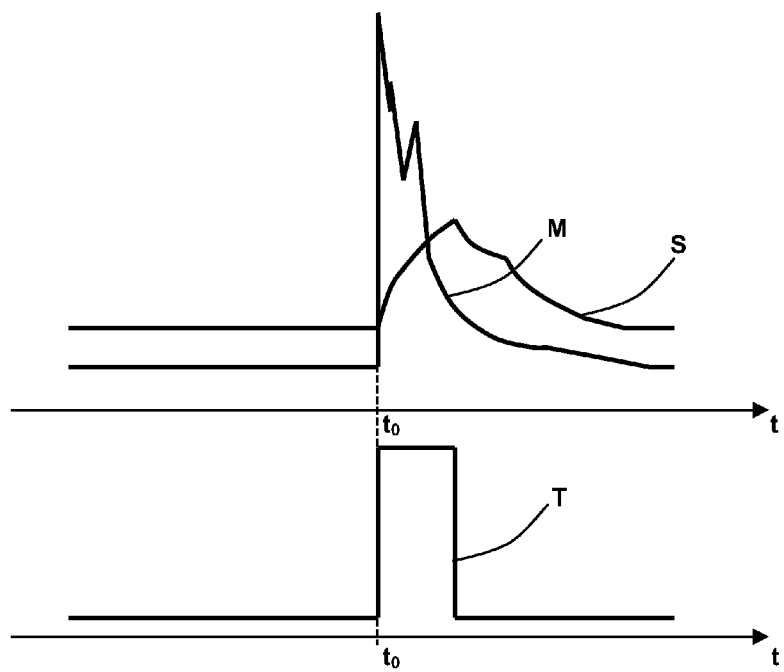
FIG. 6 is a graphic representation of the trend of electric signals relative to the processing system of FIG. 5.

One of such systems that can be included in the signal conditioning electronics 30 is schematically shown in FIGS. 5 and 6. A processing system 55 for processing the signal provided by the laminar piezoelectric transducer 25 includes devices, preferably implemented via software, that enable to gradually change in time a threshold value S, with which the value of the force signal M is compared in the microprocessor 37, when thermal variations giving rise to unwanted electric charges in the laminar piezoelectric transducer 25 occur. In the diagram of FIG. 5, an increment adder represented by the blocks 50 and 51 provides the sum of a plurality of values detected for the force signal M, in particular of the most recent n values detected, according to a "FIFO" (First-IN First-OUT) sequence. Processing units 52 and 54 provide the average of such n detected values and the threshold value S that is processed and modified, respectively, depending on the calculated average. A comparator 56 compares the current force signal M with such threshold value S. According to the processing system 55, an average of the values of the force signal M is carried out as these values are collected, for example the last 8192 values (that is n=8192, considering a typical sampling frequency of 100 khz) are averaged, and the threshold value S is dynamically varied depending on this average. As a consequence, slow, gradual variations of the force signal M, like those caused by thermal drift phenomena or unwanted capacitive effects, correspond to variations of the threshold value S too, which prevent the first one (M) from exceeding the second one (S). As hereinbefore described with reference to figure and to the signal St, in consequence of the contact between the feeler 11 and the part to be checked 13, there is a sudden variation of the signals in output from the laminar piezoelectric transducer 25 and thus a variation of the force signal M that is as sudden as the one of the output signals. In this case, the threshold value S undergoes small and slow variations in time and thus it is exceeded by the force signal M. As a consequence, the microprocessor 37 generates the touch signal T. The diagrams of FIG. 6 schematically show how the threshold value S dynamically varies in time owing to slow, gradual variations of the force signal M caused by an increase in temperature. At an instant $t_o$, further to the contact between the feeler 11 and the part to be checked 13, there is a sudden variation of the force signal M that exceeds the threshold value S and causes the generation of the touch signal T.

Even the solution to which FIGS. 5 and 6 refer properly operates in case of gradual thermal variations, and the substantial immunity to sudden changes in temperature is ensured by the thermal insulation system including the element 28 (integral or divided in different parts) made of thermal insulating material that is arranged at the bearing and locating area.

Figure 7:
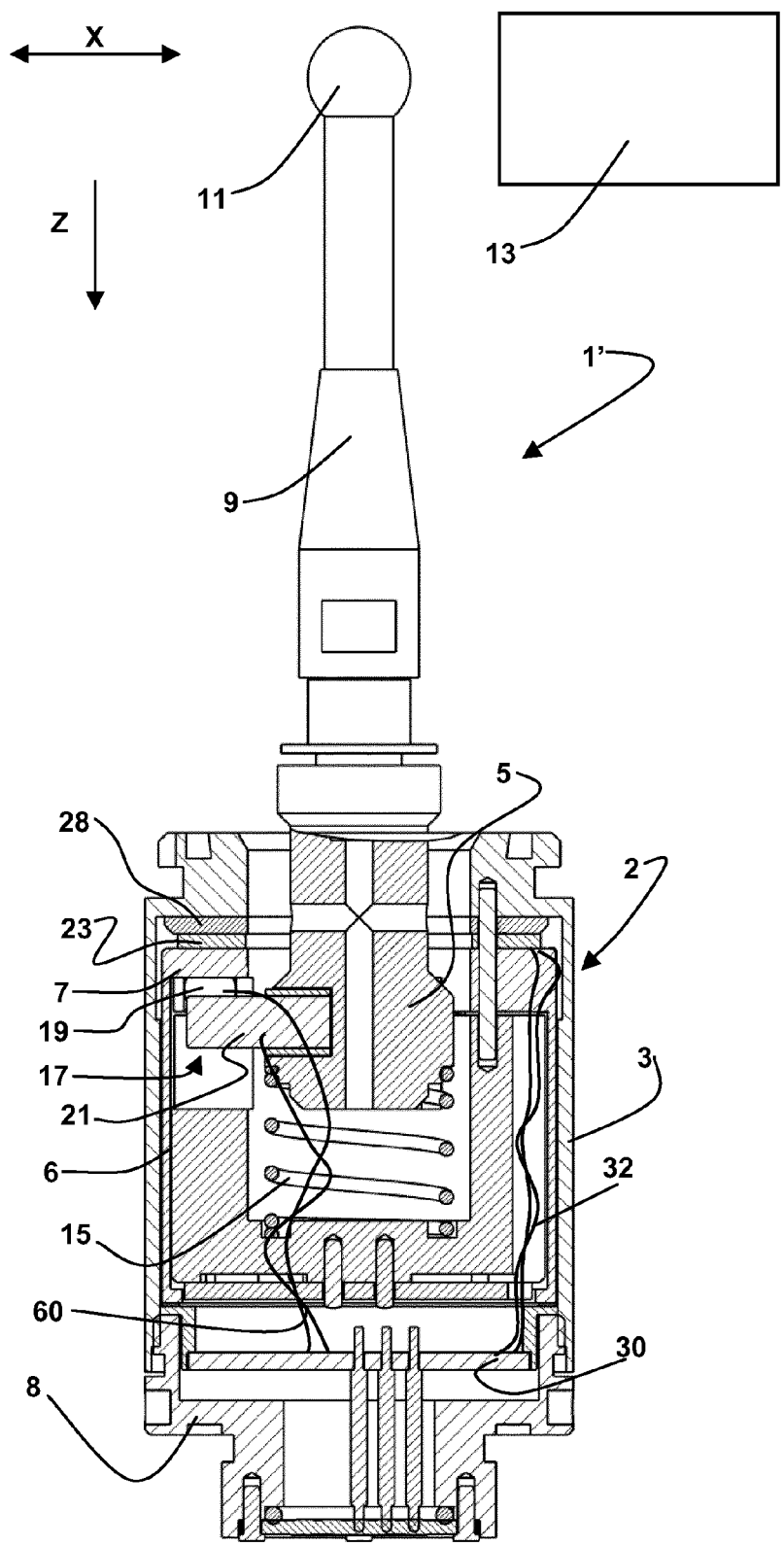
FIG. 7 is a simplified, longitudinal section of a touch probe, with some parts shown in view, according to a different embodiment of the invention.

An alternative solution of a probe 1' according to the invention is shown in FIG. 7. The probe 1' of FIG. 7 is substantially identical to the probe 1 of FIG. 1 and thus the description of like parts, marked with the same reference numbers, is not repeated. The only difference is that there is a second detection device, which is per se known and similar to what has been described in the first part of the description with reference to the patent No. U.S. Pat. No. 4,972,594. In particular, an electric circuit is positioned at the constraint and positioning system 17, such electric circuit being closed when the three radial elements 21 are housed in the V-shaped seats and contact the respective couples of balls 19. The electric circuit of the second detection device includes electric leads that connect the electric circuit to the signal conditioning electronics 30, such leads being shown in as simplified way in FIG. 7 with a couple of wires 60. The signal of the second detection device is handled in the microprocessor 37 in order to confirm, after a preset time interval (for example a tenth of milliseconds) that the force signal M generated by the laminar piezoelectric transducer 25 actually corresponds to a contact occurred between the feeler 11 and the part to be checked 13. Moreover, as after a pulse signal is emitted it is no longer possible to receive from the laminar piezoelectric transducer 25 information about the system status (in particular to know whether the movable armset 5 is deflected with respect to the support frame 2 or not), such information can be obtained from the second detection device.

Therefore, while in the probe 1 of FIG. 1 the constraint and positioning system 17 only serves as so-called "overstroke", i.e. the possibility for the movable armset 5, integral with the feeler 11, of displacing with respect to the support frame for avoiding excessive stresses and breakages consequent to the contact between the probe 1 and the part to be checked 13, in the probe 1' of FIG. 7 the displacements of the movable armset 5 with respect to the support frame 2 are connected also to the operation of the second detection device, whose signalling is used by the microprocessor 37 for the proper emission of the touch signal T.

Figure 8:
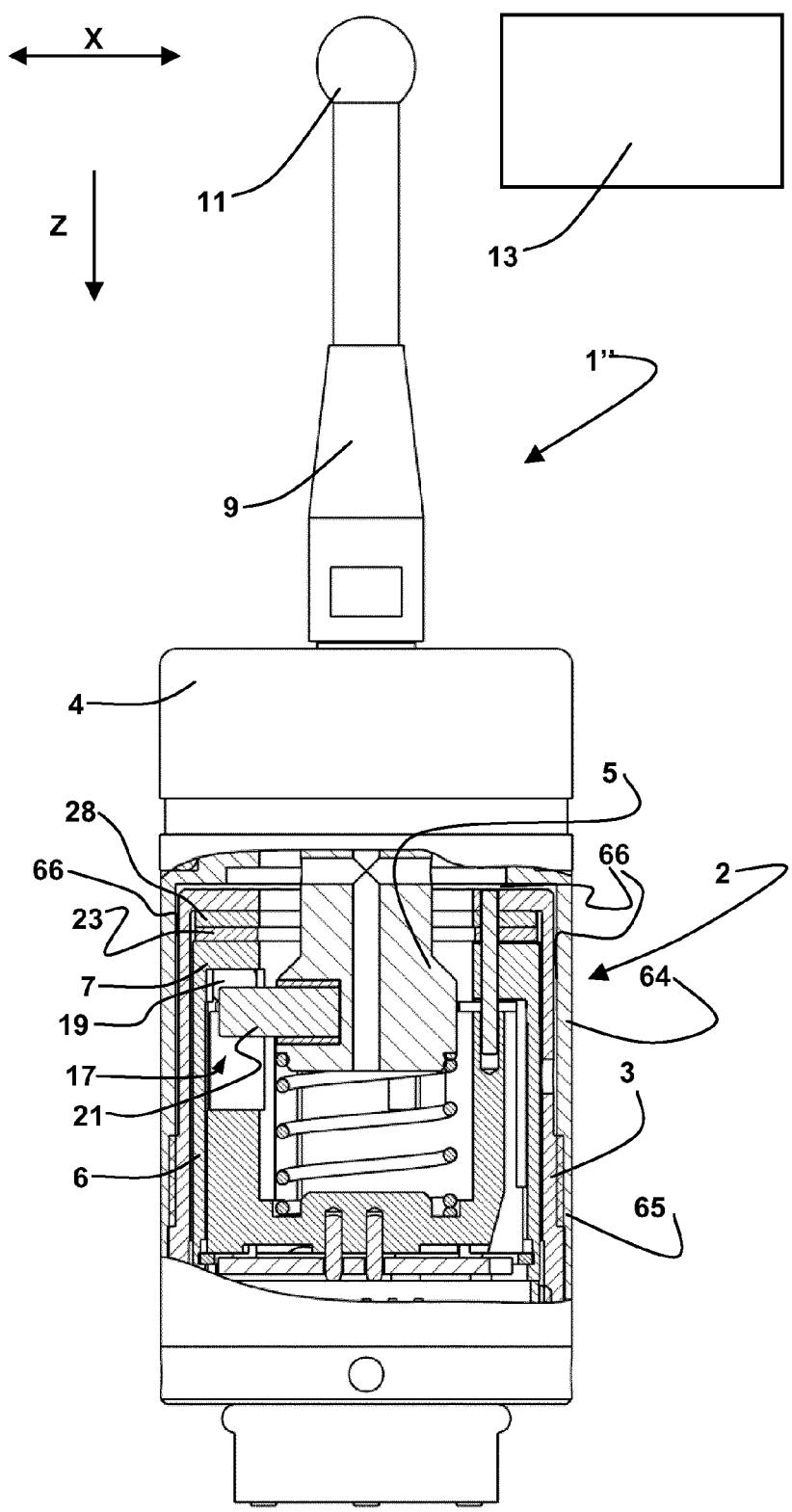
FIG. 8 is a simplified, longitudinal section of a touch probe, with some parts shown in view, according to a third, different embodiment of the invention.

FIG. 8 shows a probe 1" according to a different embodiment of the invention. The probe 1" includes many of the components of the probes 1 and 1', thus the description of like components, marked with the same reference numbers, is not repeated. FIG. 8 shows also a protective cap 4, not sectioned, which is connected to the support frame 2 and includes, among other things, sealing gaskets, such cap being omitted in the simplified sections of FIGS. 1 and 7. The main difference of the probe 1" from the probes 1 and 1' is the presence of a further component of the thermal insulation system, i.e. an insulating hollow body 64 that has one end 65 connected to the protective casing 3. The insulating hollow body 64 includes a substantially cylindrical recess housing the protective casing 3 so as to define, at least in one longitudinal length including the section in which the laminar piezoelectric transducer 25 lies, a thermal insulating hollow space 66 between the protective casing 3 and the insulating hollow body 64. In the example of FIG. 8, the thermal insulating hollow space 66 extends even transversally at the end opposite to the locking end 65. An air cushion that forms in the thermal insulating hollow space 66 (for example with a thickness of a few tenths of mm) enables the thermal insulation of the probe where the detecting device 23 is placed, and prevents sudden environmental thermal variations, such as those caused by coolant spurts, from being suddenly transmitted to the laminar piezoelectric transducer 25. In this way, possible thermal variations reach the laminar piezoelectric transducer 25 in a gradual way, and the negative effects can be easily avoided thanks to systems such as those illustrated with reference to FIG. 4 and to FIGS. 5 and 6.

The thermal insulation system including the insulating hollow body 64 might substitute the element 28 made of fibreglass included in the embodiments previously described, but generally, in the embodiment of the present invention as shown in FIG. 8, both the thermal insulation systems are provided.

The insulating hollow body 64 can be made of various materials, for example steel or an iron-nickel alloy featuring low coefficient of thermal expansion, such as Invar®.

Figure 9:
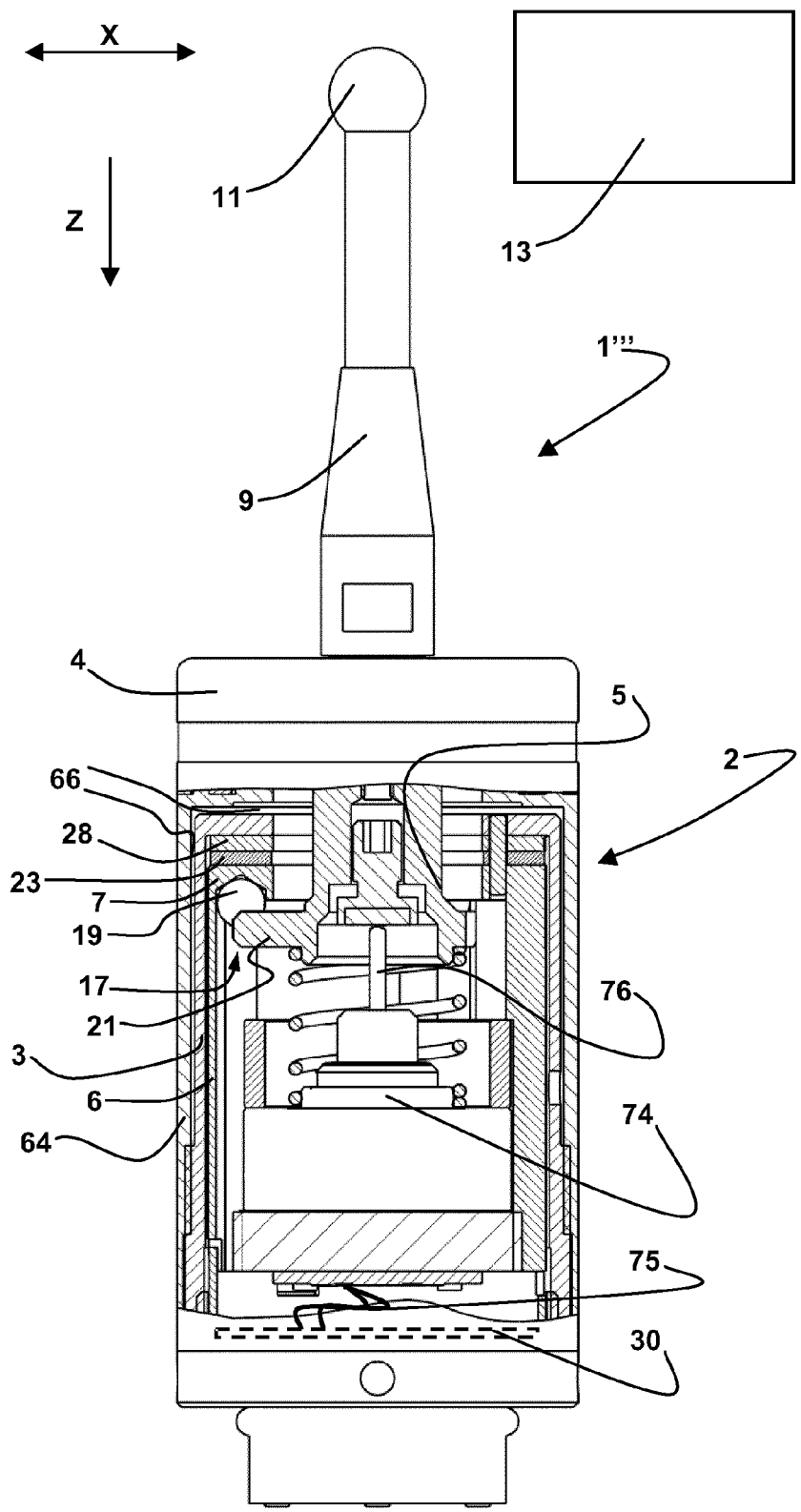
FIG. 9 is a simplified, perspective, longitudinal section of a touch probe according to a further embodiment of the invention.

Another embodiment among the possible different implementations of a touch probe according to the invention is shown in FIG. 9. The probe 1''' has features that are mostly similar to those of the probes 1, 1' and 1" of the FIGS. 1, 7 and 8 and are not here disclosed in detail.

The probe 1''' includes, like the probe 1' of FIG. 7, a second detection device implemented, in this case, with a microswitch 74 that is shown not sectioned in FIG. 9 and is connected to the signal conditioning electronics 30 by means of leads sketched and marked with the reference number 75. The microswitch 74, per se known, includes a transmission shaft 76, axially movable, which is coupled to the movable armset 5 for transmitting displacements of the latter and causing the microswitch 74 to consequently emit a signal. Such signal of the second detection device, in this case consisting in the microswitch 74, is used by the microprocessor 37 as previously described with reference to the probe 1' of FIG. 7, to properly emit the touch signal T.

Figure 10:
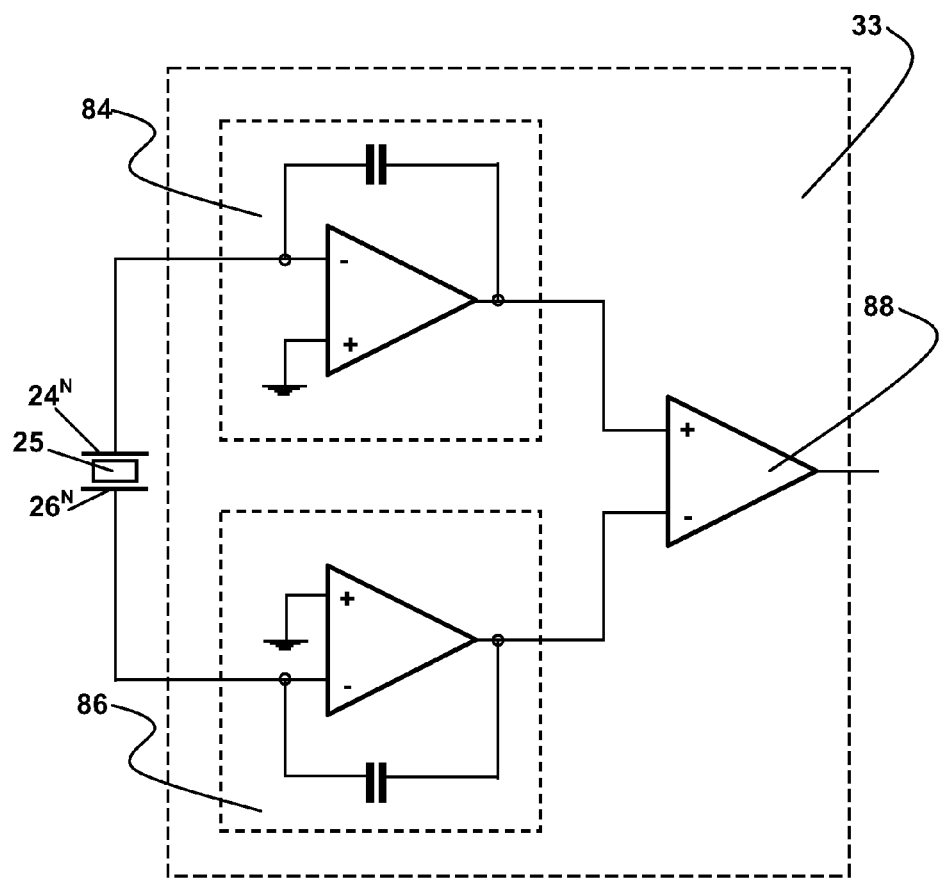
FIG. 10 is a circuit schematic diagram of a processing aspect of the signal of a probe according to the invention.

The microswitch 74 can be provided in a touch probe with characteristics differing from the probes shown in FIG. 9. The probe can include, for example, a thermal insulation system only with the element 28 made of thermal insulating material (like the probes 1 and 1' of FIGS. 1 and 7). FIG. 10 refers to the particular, advantageous implementation shown in FIG. 3, where both the circuit boards 24, 26 are electrically connected to each differential charge amplifier 33. More specifically, each of the terminals in the circuit boards 24 and 26, here marked with the reference numbers $24^N$ and $26^N$, placed at the ends of the piezoelectric element 25 at one of the sensitive sectors 23', 23" and 23''', is connected to a charge amplifier unit 84 and 86 that generates a signal responsive to the electric charge Q (of the order of a few picocoulombs) provided at the respective terminal $24^N$ and $26^N$. The absolute value of the difference of the signals in output from the charge amplifier units 84 and 86, provided for example by a differential amplifier 88, represents the signal generated by the piezoelectric element 25 at one of the sensitive sectors 23', 23" and 23"' and is aimed to be digitalized and added to the other signals, according to the diagram of FIG. 3, after any further processing, such as the one of FIG. 4, which may be carried out.

Figure 11:
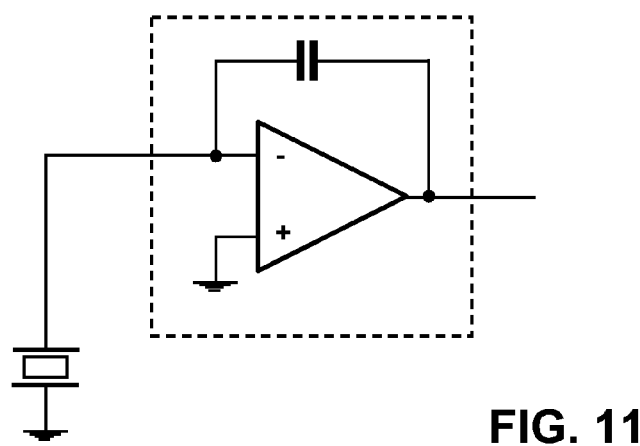
FIG. 11 is a circuit schematic diagram of a known solution concerning the signal processing of a piezoelectric transducer.

With respect to a known embodiment, such as the one sketched in FIG. 11, wherein one of the terminals at the ends of the piezoelectric element is connected to a ground, the differential implementation of FIG. 10, according to the invention, is particularly advantageous as it enables to dramatically reduce possible electrical noises.

Indeed, in applications of the probe according to the invention—in one of the embodiments 1,1',1",1"' here shown and in other possible embodiments—on machine tools, the ground is typically the casing of the machine tool itself that usually features a lot of electrical noise. When employing a known implementation such as that one of FIG. 11, electrical noises generated in consequence of the grounding can give rise to a critical application. A differential implementation according to the invention, such as the one schematically shown in FIG. 10, is substantially immune to this type of noises, as the obtained signal does not depend on the characteristics of the ground used.

Other embodiments for a touch probe according to the present invention can be provided, with alternative implementations of the known parts concerning the mechanical structure and/or the processing of the signals involved.

The invention claimed is:

1. A touch probe for checking position or dimensions of a part in machine tools or measuring machines including
    a support frame with
        a protective casing and
        a bearing and locating area,
    a movable armset that is partly housed in the protective casing and includes an arm carrying a feeler adapted to touch the part to be checked,
    a thrust device arranged between the support frame and the movable armset for urging the movable armset against the bearing and locating area,
    a constraint and positioning system between the movable armset and the support frame at the bearing and locating area, and
    a detection device with a laminar piezoelectric transducer connected to the support frame and adapted to provide a signal in consequence of a force applied to the feeler,
    wherein said laminar piezoelectric transducer is arranged in the protective casing and is connected to the support frame at the bearing and locating area, and
    the support frame includes a thermal insulation system with at least one element made of thermal insulating material between the protective casing and said laminar piezoelectric transducer at said bearing and locating area.

2. The touch probe according to claim 1, wherein said at least one element made of thermal insulating material is made of fiberglass.

3. The touch probe according to claim 1, wherein said thermal insulating system further includes an insulating hollow body, the protective casing being arranged in said insulating hollow body.

4. The touch probe according to claim 3, wherein the protective casing has a substantially cylindrical shape and the insulating hollow body has a substantially cylindrical recess housing the protective casing, so as to define a thermal insulating hollow space between the protective casing and the insulating hollow body.

5. The touch probe according to claim 3, wherein said insulating hollow body is made of an iron-nickel alloy featuring low coefficient of thermal expansion.

6. The touch probe according to claim 1, wherein the protective casing is made of an iron-nickel alloy featuring low coefficient of thermal expansion.

7. The touch probe according to claim 1, wherein the constraint and positioning system includes an isostatic rest system between the movable armset and the support frame.

8. The touch probe according to claim 4, wherein said isostatic rest system includes three support areas between the movable armset and the support frame.

9. The touch probe according to claim 8, wherein said detection device includes three sensitive sectors at the three support areas.

10. The touch probe according to claim 8, wherein each one of said three support areas includes a V-shaped seat and a radial element arranged, under the thrust applied by the thrust device, in the V-shaped seat, the V-shaped seats and the radial elements being defined in the one and the other of said support frame and movable armset, respectively.

11. The touch probe according to claim 10, further including a second detection device adapted to provide a signal indication of the mutual position of the movable armset and the support frame and including an electric circuit which is closed when the radial elements are arranged in the V-shaped seats.

12. The touch probe according to claim 1, including a second detection device adapted to provide a signal indicative of the mutual position of the movable armset and the support frame.

13. The touch probe according to claim 1, wherein said laminar piezoelectric transducer is made of polyvinylidene fluoride.

14. The touch probe according to claim 1, further including signal conditioning electronics connected to the support frame.

15. The touch probe according to claim 14, wherein said signal conditioning electronics include a processing system with filtering components of a signal provided by the laminar piezoelectric transducer, the processing system being adapted to obtain a filtered signal, to compare the latter to said signal provided by the laminar piezoelectric transducer, and to output an output signal that is substantially equal to zero in case of gradual variations of said signal provided by the laminar piezoelectric transducer.

* * * * *